United States Patent Office 3,081,275
Patented Mar. 12, 1963

3,081,275
INCREASING THE PARTICLE SIZE OF SYNTHETIC RUBBER LATICES BY FREEZING AND THAWING LATICES CONTAINING UNREACTED MONOMERS
James A. Reynolds, Naugatuck, Conn., assignor to United States Rubber Company, New York, N.Y., a corporation of New Jersey
No Drawing. Filed Jan. 10, 1958, Ser. No. 708,069
9 Claims. (Cl. 260—29.7)

This invention relates to increasing the size of the dispersed polymer particles in synthetic rubber latices.

Synthetic rubber latices, as is well known, may be prepared by the emulsion polymerization in an aqueous medium of butadienes-1,3, and mixtures of butadienes-1,3 with other polymerizable compounds capable of forming copolymers with butadienes, such as aryl olefines, e.g. styrene. Generally the emulsion is polymerized to a conversion of 50% to 95% of the monomers to polymer, at which point a shortstopping agent is added to prevent further polymerization, and unreacted monomers are removed as by venting off volatile monomers, e.g. butadiene-1,3, and vacuum or steam distilling (so-called stripping) liquid monomers, e.g. styrene. Such synthetic rubber latices conventionally have an average particle diameter from 300 to 1000 Angstrom units, which is much smaller than in natural latex and which must be increased when the latex is to be concentrated as by evaporation concentration or creaming in order to maintain the fluidity of the latex at the high concentrations. It has been observed that when a butadiene-styrene copolymer synthetic rubber latex is frozen and then thawed, the particle size of the latex is increased and part of the soap is desorbed. ("The Electrophoretic Mobility of Type II GR–S Latex," by Maron, Turnbull and Elder, Jour. Amer. Chem. Society, 70, 582–7 (1948), particularly page 586.) Such desorption of the soap destabilizes the latex with formation of macroscopic particles of coagulum or "pre-floc."

According to the present invention, the particle size of a synthetic rubber latex which is an emulsion polymerizate of material selected from butadienes-1,3 and mixtures of butadienes-1,3 with up to 70% of such mixtures of aryl olefines is further increased in the freezing and thawing of the latex and the stability of the latex is improved as shown by a reduction in the amount of macroscopic coagulum particles or "pre-floc" formed during the freeze-thaw cycle.

In carrying out the present invention, the synthetic rubber latex which is frozen and thawed to increase the particle size of the latex additionally contains monomeric material selected from butadienes-1,3 and aryl olefines, the presence of which in the latex during the freeze-thaw cycle imparts the improvements of the present invention in further increasing the particle size of the latex and increasing the stability of the latex as shown by a reduction in the amount of macroscopic coagulum in the treated latex. Butadienes-1,3 that may be polymerized or copolymerized in the preparation of the synthetic rubber and that may be present as monomers in the synthetic rubber latex during the freeze-thaw cycle according to the present invention are butadiene-1,3, 2-methyl-butadiene-1,3 (isoprene), 2,3-dimethyl-butadiene-1,3, and piperylene. Aryl olefines that may be copolymerized with butadienes-1,3 in the preparation of the synthetic rubber and that may be present as monomers in the synthetic rubber latex during the freeze-thaw cycle according to the present invention are styrene, alpha-methyl styrene, ring substituted alkylstyrenes, e.g. vinyl toluene, ring substituted monochlorostyrenes, e.g. parachlorostyrene and mixtures of ring substituted monochlorostyrene isomers, and ring substituted dichlorostyrenes, e.g. mixtures of ring substituted dichlorostyrene isomers.

The present invention is particularly useful in increasing the particle size of commercial synthetic rubber latices that are emulsion polymerizates of a major proportion of butadiene-1,3 and a minor proportion of styrene, and that have a conventional average particle diameter from 300 to 1000 Angstrom units. The monomers (butadienes-1,3 and/or aryl olefines) may be added to a latex from which unreacted monomers from the polymerization reaction have been removed after shortstopping, or the monomers may be the residual unreacted monomers from the polymerization reaction which is generally taken to 50% to 95% conversion. When venting off unreacted monomeric butadiene-1,3 after polymerization, 15% to 25% of the butadiene-1,3 remains in the latex for a short time and gradually is volatilized. Any butadiene-1,3 remaining in the latex after venting will be removed in any subsequent stripping operation for removal of liquid monomers such as styrene. The amount of monomers in the latex before freezing and thawing may be from 3 to 100 parts by weight per 100 parts of synthetic rubber. Example 1 shows the effect of incorporating 7 parts of styrene per 100 parts of rubber in a stripped rubber latex and freezing and thawing. The time that the latex is frozen is not critical but should not be prolonged to such an extent as to coagulate the latex. The latex may be frozen and immediataely thawed. The latex may be maintained in frozen condition for a short time generally up to 15 minutes, and then thawed, but it is preferred to thaw the latex as soon as practicable after the freezing has been completed. The monomers do not polymerize during the freeze-thaw cycle, a shortstopping agent having been added, and the monomers will generally be removed after the freeze-thaw cycle. It is preferable not to cool the frozen latex too far below its freezing point, and generally not below −10° F. Alkali-metal soap and/or alkali-metal hydroxide may be added to the latex before freezing and thawing, if desired, to additionally stabilize the latex. The freezing and thawing of the latex in the presence of the butadiene and/or aryl olefine monomers without polymerization of the monomers increases the particle size of the latex to a much greater extent than the freezing and thawing of the latex without the monomers and gives a latex of improved stability as shown by a decreased amount of macroscopic coagulum or "pre-floc."

The latex is a conventional latex having an average particle diameter from 300 to 1000 Angstrom units prepared by polymerizing the rubber-forming monomers selected from butadienes-1,3 and mixtures of butadienes-1,3 and up to 70% of such mixtures of aryl olefines in emulsion in water in a ratio of water to monomers generally in the range from 1.3:1 to 3:1, to a conversion of 50% to 95%, giving a latex having a concentration of synthetic rubber from 20% to 45%. The rubber-forming monomers may be emulsified with the aid of conventional emulsifying agents, such as 3 to 10 parts of water-soluble soaps of soap-forming monocarboxylic acids having 10 to 20 carbon atoms in the molecule, per 100 parts of monomers, e.g. sodium or potassium soaps of fatty acids or mixtures thereof with sodium or potassium soaps of rosin acids, such as abietic acid, or dehydrogenated, hydrogenated or disproportionated rosin acids. The emulsion may be polymerized at conventional temperature from 0° C. to 70° C. in the presence of a conventional oxidizing catalyst such as an alkali-metal persulfate, e.g. potassium persulfate, or an organic hydroperoxide, e.g. cumene hydroperoxide, diisopropyl benzene hydroperoxide. After the desired conversion of monomers to polymer, the polymerization reaction may be shortstopped by the addition of 0.05 to 1 part of a conventional shortstopping agent, such as potassium dimethyldithiocarbamate, hydroquinone, or dinitrochlorobenzene per 100 parts of original monomers.

The following examples illustrate the invention. All parts and percentages referred to herein are by weight.

*Example 1*

A synthetic rubber latex was prepared by polymerizing at 5° C. an aqueous emulsion of 70 parts of butadiene-1,3 and 30 parts of styrene in 180 parts of water containing 0.3 part of cumene hydroperoxide and 4 parts of potassium oleate to a conversion of about 80%, at which point 0.2 part of potassium dimethyldithiocarbamate shortstopper was added and unreacted monomers were removed by venting off most of the butadiene-1,3 and stripping the styrene and remaining butadiene-1,3 by steam distillation. The latex had a solids content of 30.6% and an average particle diameter of 550 Angstrom units.

To a portion of the latex was added 1 part of potassium oleate per 100 parts of latex solids, and potassium hydroxide to a pH of about 10.5. To a second portion of the latex was added the same amount of potassium oleate and potassium hydroxide and also 7 parts of styrene per 100 parts of latex solids. The two latices were rotated in separate bottles in a bath operating at −18° C. for 10 to 15 minutes (about 7 minutes to completely freeze the latices), and then thawed. The styrene was stripped from the second latex by steam distillation.

The average particle diameter of the frozen and thawed latex without the styrene addition was 1880 Angstrom units and the latex contained 1.2 parts of readily filterable macroscopic coagulum or "pre-floc." The average particle diameter of the frozen and thawed latex containing the styrene according to the present invention was 2040 Angstrom units and the latex contained only 0.2 part of macroscopic coagulum or "pre-floc," showing an increase in particle size and improvement in the stability of the latex as shown by decreased coagulum or "pre-floc."

*Example 2*

Three latices of synthetic rubber copolymers of 70 parts of butadiene-1,3 and 30 parts of styrene were prepared similarly to the latex of Example 1 but emulsified on 4 parts of potassium oleate (Latex A), 3 parts of potassium oleate and 1.5 parts of potassium soap of disproportionated rosin acid (Latex B), and 1.5 parts of potassium oleate and 3 parts of potassium soap of disproportionated rosin acid (Latex C), respectively, per 100 parts of monomers. The latices were shortstopped at 60% conversion by addition of 0.4 part of potassium dimethyldithiocarbamate.

Butadiene-1,3 was vented from the three latices. The average particle diameters were 470, 320 and 470 Angstrom units respectively. One half of each latex was stripped of unreacted styrene and any residual butadiene-1,3 monomers by steam distillation, and unreacted styrene and any residual butadiene monomers were permitted to remain in the other half of each latex. The stripping operation did not change the particle size of the latices.

The six latices were separately applied in a thin stream on a rotating roll cooled internally with methanol-water mixture to 0° F. to −10° F. so that the latex was "flash" frozen and then quickly removed with a scraper or doctor blade. The hold-up time during which the latex was completely frozen was about 14 seconds. The rate of flow was regulated so that a continuous band of frozen latex was delivered to a warming tank.

The average particle diameters of the frozen and thawed latices A, B and C from which unreacted styrene and residual butadiene-1,3 monomers were stripped were 1320, 1280 and 1400 Angstrom units, respectively, whereas the average particle diameters of the frozen and thawed unstripped latices A, B and C of the present invention were 1450, 1340 and 1550 Angstrom units, respectively.

*Example 3*

Seven latices were prepared similarly to the latex of Example 1 but using different polymerizable monomers and shortstopping at about 75% conversion by addition of 0.2 part of potassium dimethyldithiocarbamate. The monomers varied from butadiene-1,3 alone to mixtures of butadiene-1,3 and styrene up to a ratio of 70 parts of styrene to 30 parts of butadiene-1,3. Unreacted butadiene-1,3 was vented from the reaction bottles leaving 15% to 25% of the residual butadiene-1,3 in the latex with all the unreacted styrene. The average particle diameters of the latices were about 500 Angstrom units. The seven latices were flash frozen and thawed as in Example 2 and the average particle diameters measured. Results are shown in the following table:

| Ratio of butadiene-1,3 to styrene: | Ave. particle diameter (Angstrom units) |
|---|---|
| 100:0 | 1240 |
| 85:15 | 1270 |
| 70:30 | 1310 |
| 60:40 | 1320 |
| 50:50 | 1320 |
| 40:60 | 1340 |
| 30:70 | 1410 |

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method which comprises freezing a synthetic rubber latex, said synthetic rubber latex being an emulsion polymerizate of monomers selected from the group consisting of hydrocarbon butadienes-1,3 and mixtures of hydrocarbon butadienes-1,3 with up to 70% of the mixtures of aryl olefines, said hydrocarbon butadiene-1,3 being selected from the group consisting of butadiene-1,3, isoprene, 2,3-dimethyl-butadiene-1,3, and piperylene, and said aryl olefines being selected from the group consisting of styrene, alpha-methyl styrene, vinyl toluene, ring substituted monochlorostyrenes and ring substituted dichlorostyrenes, the emulsion of said monomers before polymerization containing 3 to 10 parts of water-soluble soap of soap-foaming monocarboxylic acids having 10 to 20 carbon atoms in the molecule per 100 parts of said monomers, said latex having a concentration of synthetic rubber from 20% to 45% and containing 3 to 100 parts of monomers selected from the group consisting of the aforementioned hydrocarbon butadienes-1,3 and the aforementioned olefines per 100 parts of said synthetic rubber, said latex being frozen at a temperature between its freezing point and −10° F. for a time insufficient to coagulate the latex, and then thawing said latex.

2. The method which comprises freezing a synthetic rubber latex, said synthetic rubber latex being an emulsion polymerizate of monomers selected from the group consisting of hydrocarbon butadienes-1,3 and mixtures of hydrocarbon butadienes-1,3 with up to 70% of the mixtures of aryl olefines, said hydrocarbon butadiene-1,3 being selected from the group consisting of butadiene-1,3, isoprene, 2,3-dimethyl-butadiene-1,3, and piperylene, and said aryl olefines being selected from the group consisting of styrene, alpha-methyl styrene, vinyl toluene, ring substituted monochlorostyrenes and ring substituted dichlorostyrenes, the emulsion of said monomers before polymerization containing 3 to 10 parts of water-soluble soap of soap-forming monocarboxylic acids having 10 to 20 carbon atoms in the molecule per 100 parts of said monomers, said latex having a concentration of synthetic rubber from 20% to 45% and containing 3 to 100 parts of monomers selected from the group consisting of the aforementioned hydrocarbon butadienes-1,3 and the aforementioned aryl olefines per 100 parts of said synthetic rubber, said latex being frozen at a temperature between its freezing point and −10° F. for a time up to 15 minutes, and then thawing said latex.

3. The method which comprises freezing a synthetic rubber latex, said synthetic rubber latex being an emulsion polymerizate of a mixture of butadiene-1,3 and up to 70% of the mixture of styrene, the emulsion of said butadiene-1,3 and styrene before polymerization containing 3 to 10 parts of water-soluble soap of soap-forming monocarboxylic acids having 10 to 20 carbon atoms in the molecule per 1000 parts of said butadiene-1,3 and styrene, said latex having a concentration of synthetic rubber from 20% to 45% and containing 3 to 100 parts of monomers selected from the group consisting of butadiene-1,3 and styrene per 100 parts of said synthetic rubber, said latex being frozen at a temperature between its freezing point and −10° F. for a time insufficient to coagulate the latex, and then thawing said latex.

4. The method which comprises freezing a synthetic rubber latex, said synthetic rubber latex being an emulsion polymerizate of a major proportion of butadiene-1,3 and a minor proportion of styrene, the emulsion of said butadiene-1,3 and styrene before polymerization containing 3 to 10 parts of water-soluble soap of soap-forming monocarboxylic acids having 10 to 20 carbon atoms in the molecule per 100 parts of said butadiene-1,3 and styrene, said latex having a concentration of synthetic rubber from 20% to 45% and containing 3 to 100 parts of monomers selected from the group consisting of butadiene-1,3 and styrene per 100 parts of said synthetic rubber, said latex being frozen at a temperature between its freezing point and −10° F. for a time insufficient to coagulate the latex, and then thrawing said latex.

5. The method which comprises freezing a synthetic rubber latex, said synthetic rubber latex being an emulsion polymerizate of a major proportion of butadiene-1,3 and a minor proportion of styrene, the emulsion of said butadiene-1,3 and styrene before polymerization containing 3 to 10 parts of water-soluble soap of soap-forming monomcarboxylic acids having 10 to 20 carbon atoms in the molecule per 100 parts of said butadiene-1,3 and styrene, said latex having a concentration of synthetic rubber from 20% to 45% and containing 3 to 100 parts of monomers selected from the group consisting of butadiene-1,3 and styrene per 100 parts of said synthetic rubber, said latex being frozen at a temperature between its freezing point and −10° F. for a time up to 15 minutes, and then thawing said latex.

6. The method which comprises polymerizing to 50% to 95% conversion an aqueous emulsion of monomers selected from the group consisting of butadiene-1,3 and mixtures of butadiene-1,3 with up to 70% of the mixture of styrene to produce a synthetic rubber latex, the emulsion of monomers before polymerization containing 3 to 10 parts of water-soluble soap of soap-forming monocarboxylic acids having 10 to 20 carbon atoms in the molecule per 100 parts of said monomers, said latex having a concentration of synthetic rubber from 25% to 45%, venting unreacted butadiene-1,3 monomer from the latex leaving any unreacted styrene monomer and 15% to 25% of the unreacted butadiene-1,3 monomer as residual monomers, said residual monomers being at least 3% of the rubber content of the latex, freezing the thus treated latex at a temperature between its freezing point and −10° F. for a time insufficient to coagulate the latex, and then thawing the latex.

7. The method which comprises polymerizing to 50% to 95% conversion an aqueous emulsion of monomers selected from the group consisting of butadiene-1,3 and mixtures of butadiene-1,3 with up to 70% of the mixture of styrene to produce a synthetic rubber latex, the emulsion of monomers before polymerization containing 3 to 10 parts of water-soluble soap of soap-forming monocarboxylic acids having 10 to 20 carbon atoms in the molecule per 100 parts of said monomers, said latex having a concentration of synthetic rubbers from 25% to 45%, venting unreacted butadiene-1,3 monomer from the latex leaving any unreacted styrene monomer and 15% to 25% of the unreacted butadiene-1,3 monomer as residual monomers, said residual monomers being at least 3% of the rubber content of the latex, freezing the thus treated latex at a temperature between its freezing point and −10° F. for a time up to 15 minutes, and then thawing the latex.

8. The method which comprises polymerizing to 50% to 95% conversion an aqueous emulsion of a mixture of a major proportion of butadiene-1,3 and a minor proportion of styrene to produce a synthetic rubber latex, the emulsion of said butadiene-1,3 and styrene before polymerization containing 3 to 10 parts of water-soluble soap of a soap-forming monocarboxylic acids having 10 to 20 carbon atoms in the molecule per 100 parts of said butadiene-1,3 and styrene, said latex having a concentration of synthetic rubber from 25% to 45%, venting unreacted butadiene-1,3 monomer from the latex leaving the unreacted styrene monomer and 15% to 25% of the unreacted butadiene-1,3 monomer as residual monomers in the latex, said residual monomers being at least 3% of the rubber content of the latex, freezing the thus treated latex at a temperature between its freezing point and −10° F. for a time insufficient to coagulate the latex, and then thawing the latex.

9. The method which comprises polymerizing to 50% to 95% conversion an aqueous emulsion of a mixture of a major proportion of butadiene-1,3 and a minor proportion of styrene to produce a synthetic rubber latex, the emulsion of said butadiene-1,3 and styrene before polymerization containing 3 to 10 parts of water-soluble soap of a soap-forming monocarboxylic acids having 10 to 20 carbon atoms in the molecule per 100 parts of said butadiene-1,3 and styrene, said latex having a concentration of synthetic rubber from 25% to 45%, venting unreacted butadiene-1,3 monomer from the latex leaving the unreacted styrene monomer and 15% to 25% of the unreacted butadiene-1,3 monomer as residual monomers in the latex, said residual monomers being at least 3% of the rubber content of the latex, freezing the thus treated latex at a temperature between its freezing point and −10° F. for a time up to 15 minutes, and then thawing the latex.

References Cited in the file of this patent

UNITED STATES PATENTS

| | | |
|---|---|---|
| 2,481,876 | Rhines | Sept. 13, 1949 |
| 2,683,699 | Gehring | July 13, 1954 |
| 2,702,285 | Bebb et al. | Feb. 15, 1955 |
| 2,897,168 | Brown | July 28, 1959 |

FOREIGN PATENTS

| | | |
|---|---|---|
| 738,342 | Great Britain | Oct. 12, 1955 |
| 758,622 | Great Britain | Oct. 3, 1956 |

OTHER REFERENCES

Noble: "Latex in Industry," 2nd edition, pages 185–188, Rubber Age, 250 West 57th Street, New York 19, N.Y. (1953).

Maron et al.: "Journal of American Chemical Society," volume 70, page 586, February 1948.

Noble: "Latex in Industry," second edition, page 189, Rubber Age, 250 West 57th Street, New York 19, N.Y. (1953).

UNITED STATES PATENT OFFICE
CERTIFICATE OF CORRECTION

Patent No. 3,081,275                            March 12, 1963

James A. Reynolds

It is hereby certified that error appears in the above numbered patent requiring correction and that the said Letters Patent should read as corrected below.

Column 4, line 48, for "soap-foaming" read -- soap-forming --; column 5, line 13, for "1000" read -- 100 --; line 35, for "thrawing" read -- thawing --; line 42, for "monomcarboxylic" read -- monocarboxylic --; column 6, lines 22 and 39, strike out "a", each occurrence.

Signed and sealed this 8th day of October 1963.

(SEAL)
Attest:

ERNEST W. SWIDER
Attesting Officer

EDWIN L. REYNOLDS
Acting Commissioner of Patents